United States Patent [19]

Sillner

[11] Patent Number: 4,845,588
[45] Date of Patent: Jul. 4, 1989

[54] TUBULAR CAPACITOR

[76] Inventor: Georg Sillner, Zeitlarn, Fed. Rep. of Germany

[21] Appl. No.: 180,744

[22] Filed: Apr. 12, 1988

[30] Foreign Application Priority Data

Apr. 16, 1987 [DE] Fed. Rep. of Germany ... 8705625[U]

[51] Int. Cl.⁴ .............................................. H01G 4/10
[52] U.S. Cl. .................................................. 361/321
[58] Field of Search ............... 361/306, 320, 321, 292, 361/294

[56] References Cited

U.S. PATENT DOCUMENTS

| | | | |
|---|---|---|---|
| 1,937,874 | 12/1933 | Debrunner | 361/294 X |
| 2,673,972 | 3/1954 | Minnium | 361/321 X |
| 2,769,944 | 11/1956 | Stein et al. | 361/321 X |
| 4,197,570 | 4/1980 | Kobayashi | 361/321 X |
| 4,593,341 | 6/1986 | Herczog | 361/321 X |

Primary Examiner—Donald A. Griffin
Attorney, Agent, or Firm—Hoffman, Wasson, Fallow & Gitler

[57] ABSTRACT

An electrical capacitor comprises a dielectric sleeve having a first conductive outer coating, and a core with a second conductive outer surface secured within the sleeve. One end of the core is enlarged, and provides a contact surface for the second conductive surface.

11 Claims, 1 Drawing Sheet

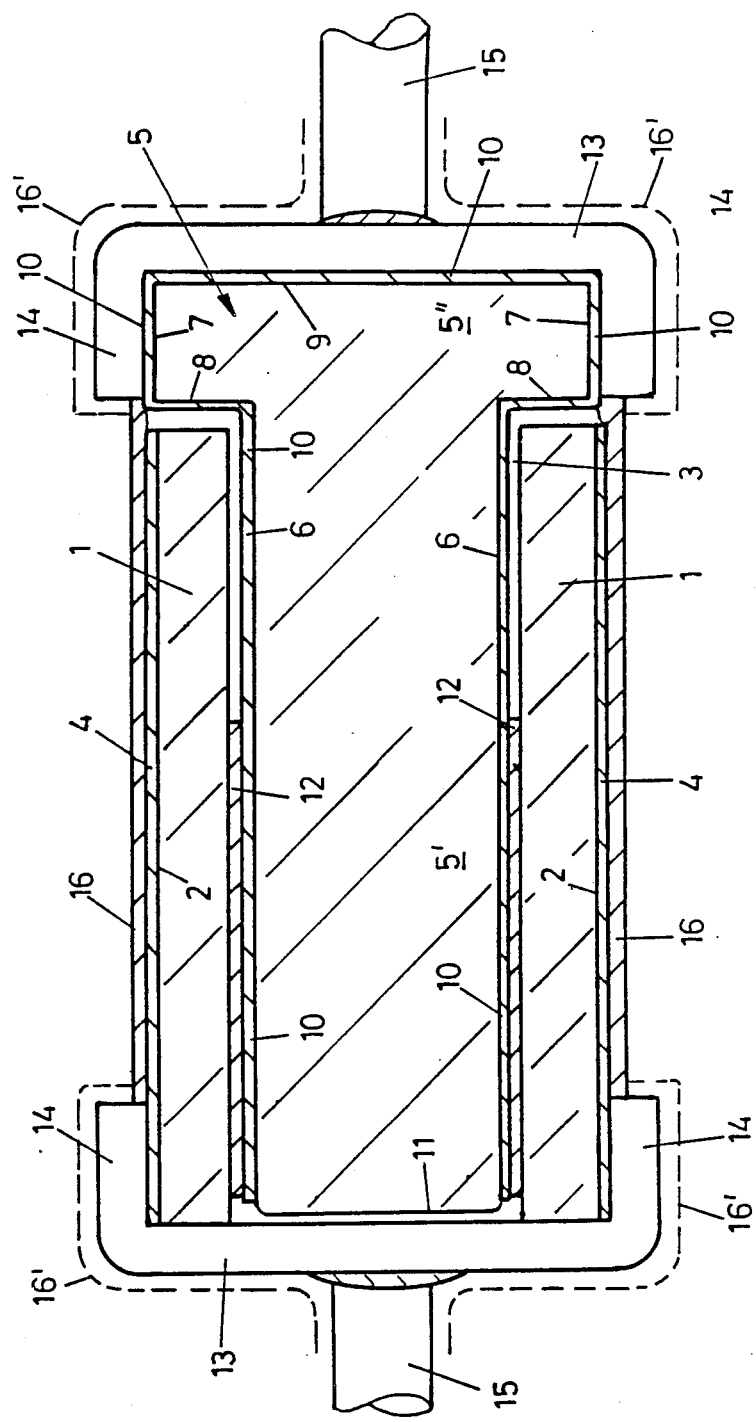

TUBULAR CAPACITOR

BACKGROUND OF THE INVENTION

The invention relates to a tubular capacitor. Such capacitors are known and, as a rule, consist of a tube or sleevelike element produced from ceramic, on whose outside peripheral surface and inside surface layers of electrically conductive material, namely metal layers are applied so that the two galvanically separated capacitor coatings are obtained.

But in the case of these known tubular capacitors it is disadvantageous that they exhibit only a small mechanical loading capacity because of the use of the sleevelike element forming the dielectric, i.e., the sleevelike element easily breaks, which raises great problems, especially in the case of contacting, i.e., in the case of attachment of contact surfaces or leads necessary for later insertion of the capacitor in an electric circuit. Contacting also in tubular capacitors recently has often taken place with the help of metal caps, on which in each case, in the formation of the tubular capacitor, a lead is connected, electrically conductive, with one end as component provided with leads. But it is also possible to provide the metal caps without leads, so that the metal caps themselves are used as leads in the later insertion of the capacitor in an electric circuit. In this case, these capacitors are then identified as "MELF tubular capacitors".

For contacting of the metal layer applied on the outside peripheral surface of the sleevelike element and forming the first capacitor coating, one of the two metal caps, designed cuplike, is put on the one end of the sleevelike element, so that this metal cap, by its peripheral wall forming the cup shape, rests electrically conductive against the metal layer applied to the outside peripheral surface. For contact between the metal layer provided on the inside surface of the sleevelike element and the metal layer forming the second capacitor coating it is necessary in these known tubular capacitors to make the metal layer forming the second capacitor coating so that it extends on the other end of the sleevelike element up to the outside peripheral surface of this element and forms a contacting surface there, which is galvanically separated from the first capacitor coating and rests, electrically conductive, against the peripheral wall of the second metal cap forming the cup shape. Already for this fact along the production of the two metal layers is expensive. But because of the slight strength of the sleevelike element it is not possible to fasten the metal caps on the sleevelike element by force fit but a soldering connection between them and the respective metal layer is necessary for holding the metal caps. This also means an additional production engineering expense, especially since the use of automatic capping machines, such as used in the production of other components (e.g., resistors), is not possible. Moreover, because of the above-mentioned soldering connections it is not possible, after capping of the sleevelike element, to fasten leads to the metal caps by welding, rather the metal caps already provided with leads must be applied to the sleevelike element, which also raises considerable production engineering problems.

The object of the invention is to show a tubular capacitor which exhibits considerably improved mechanical strength and also makes possible a simplified production.

To achieve this object, a tubular capacitor of the type initially described is designed according to the characterizing part of claim 1.

Because in the sleevelike element forming the dielectric of the capacitor there is inserted, in a matching manner, a core with at least one section, which for formation of the second capacitor coating is designed electrically conductive in at least one partial area of the peripheral surface, for the tubular capacitor a solid component body, formed from a sleevelike element and from the section of the core placed in it, is achieved, which exhibits a high mechanical strength, so that especially there is no danger that this component body will be broken or crushed by the action of outside force. In this way it is possible to use metal caps for the contacting which are held by force fit or by pressing together firmly or pressing on the sleevelike element.

Since the second capacitor is formed from an electrically conductive layer on an outside surface, namely on the peripheral surface of the core, achievement of this second capacitor coating is considerably simplified.

In the preferred embodiment of the invention the core is designed so that with another section, whose outside diameter preferably is equal to the outside diameter of the sleevelike element, it projects over the other side of the sleevelike element, and the core at least on the peripheral surface of this other section is also made electrically conductive and the contact surface of the second capacitor coating is formed there so that here the contacting also takes place with the help of metal cap held by force fit. Capping of the tubular capacitor according to the invention can take place with the help of metal cap held by force fit. Capping of the tubular capacitor according to the invention can be used either as a MELF tubular capacitor or leads can be fastened by welding on the metal caps of the capped tubular capacitor.

BRIEF DESCRIPTION OF THE DRAWING

The drawing FIGURE shows a sectional view of a tubular capacitor embodying the invention.

DESCRIPTION OF THE PREFERRED EMBODIMENT

The tubular capacitor shown in the FIGURE consists of a tubular sleevelike element 1 made of ceramic, which forms the dielectric of the capacitor and exhibits a circular cylindrical peripheral surface 2 and a through recess 3 open on both ends with a circular cross section. An electrically conductive layer, i.e., a metal layer 4, is applied to peripheral surface 2 of element 1, so that this metal layer 4 surrounding element 1 on its entire periphery extends up to an end of element 1, the left end in the FIGURE, but in the area of the right end of element 1 in the FIGURE ends at a distance from this end, i.e., peripheral surface 2 of element 1 on the right end is not covered in an annular partial area by metal layer 4. Application of metal layer 4 in the described form can take place in the most varied ways, preferably by rolling of material forming metal layer 4 after appropriate treatment (e.g. heating or burning in).

A core 5, also made of ceramic, with a section 5', is inserted in recess 3 of element 1, coming from the right end, so that this section 5' extends on the inside of recess 3 over the entire length of element 1, in other words, section 5' with its left end is about flush with the end there of element 1. In addition to section 5' core 5 also has a section 5", with which core 5 projects over the right end of element 1 from recess 3 and which exhibits a greater cross section than section 5'.

Core 5 is provided with metal layer 10 on peripheral surface 6 of section 5', on peripheral surface 7 of section 5'', on annular surface 8 running radially to the axis of core 5 and forming the transition between peripheral surfaces 6 and 7 as well as right front surface 9 of core 5, which is outside of element 1 and is formed by section 5'', a metal layer that completely covers the surface of core 5 on peripheral surface 7, of annular surface 8 and front surface 9 and is applied to peripheral surface 6 so that metal layer 10 also completely surrounds core 5 on this peripheral surface, but on the end of core 5 away from section 5'' front surface 11, formed there by section 5', as well as annular area of peripheral surface 6 adjacent to this front surface are kept free of metal layer 10. Metal layer 10 which is designed continuous on peripheral surfaces 6 and 7, annular surface 8 and front surface 9, can be applied in the most varied ways to core 5, for example by vapor deposition or by other known processes used in the production of electric components for application of metal layers. Front surface 11, kept free from metal layer 10, and adjacent annular areas on peripheral surface 6 also kept free from metal layer 10 can. e.g., be so produced that the part of metal layer 10 first applied to this area is removed in a subsequent operation by a suitable process, e.g., grinding process. Instead of this, the known masking technique optionally with inclusion of etching processes can also be used.

Further, core 5 is so designed that the outside cross section of section 5' (including metal layer 10 applied to peripheral surface 6) corresponding in its cross section shape to the cross section of recess 3 is approximately equal to or insignificantly smaller than the cross section of recess 3, and that outside cross section of section 5'' (including metal layer 10 applied to peripheral surface 7) corresponding in its cross section shape to the outside cross section of element 1 (including metal layer 4 applied to peripheral surface 2) so that the component body formed from element 1 and core 5 with its section 5' is inserted in element 1 only after production of metal layer 10, and to hold core 5 before the insertion in element 1 an adhesive layer 12 is applied to peripheral surface 6 or the metal area there of metal layer 10. The two metal layers 4 and 10 form the electrically conductive coatings of the tubular capacitor. For contacting of these coatings a cuplike metal cap 13 in each case is put on the two ends of the tubular capacitor and is held by force fitting or pressing on, and left metal cap 13 is pressed with the inside surface of its peripheral wall 14 against the area of metal layer 10 provided on peripheral surface 7 and thus establishes an electric connection to this metal layer. Since recess 3 of tubular element 1 is completely filled by section 5' of core 5, the body of tubular capacitor formed by element 1 and core 5 thus is designed solid on both ends, i.e., without a hollow space, metal caps 13 can be applied in the usual cap machines and also especially by pressing of peripheral walls 14 on the body of the tubular capacitor, without damage of breaking of the component body in this application having to be feared. Because of this solid design and the resulting possibility of fastening metal caps 13 by pressing on of peripheral walls 14, it is especially no longer necessary to connect metal caps 13 by a soldering connection to the respective metal layer 4 or 10. In this way a substantially simplified production of the tubular capacitor is achieved. Further, it is also possible, after application of metal caps 13 to weld leads 15 to them, which also contributes to a substantial simplification of production.

Further it is also possible to produce the tubular capacitor as a so-called "MELF tubular capacitor" and in this case leads 15 are dispensed with and metal caps 13 are used directly in an electric circuit or contacting of the capacitor.

In the design MELF tubular capacitor the part of the capacitor body between caps 13 and basically formed by metal layer 4 or peripheral surface 2, is covered layer 16 of protective varnish especially also producing an electrical insulation. When leads 15 are used, this layer 16 extends, as indicated by broken line 16', also over the exposed surfaces of metal caps 13 and over a partial length of leads 15 connected to the respective metal cap.

I claim:
1. A tubular capacitor comprising:
   a dielectric tubular element, having inner and outer surfaces;
   a first electrically conductive layer applied to the outer surface of the tubular element thereby forming a first capacitor plate, a portion of said layer being exposed at one end of the capacitor to form a contact surface for the first plate;
   a solid core having a first portion inserted into the tubular element and substantially filling the entire interior thereof, and a second portion extending from one end of the first portion, the second having an outer diameter at least equal to the outer diameter of the tubular element; and
   a second electrically conductive layer applied to the outer surface of said core forming a second capacitor plate, said second conductive layer comprising a first part covering the first portion of the core, and a second contiguous part covering the second portion of the core, whereby the second part forms a contact surface for said second plate.

2. A tubular capacitor according to claim 1, wherein sleevelike element is formed of a ceramic material.

3. A tubular capacitor according to claim 2, wherein said core is formed of a ceramic material.

4. A tubular capacitor according to claim 3, wherein a portion of said first core section, and an end surface adjacent thereto, lack a metal layer.

5. A tubular capacitor according to claim 1, wherein said second section is electronically conductive on its entire outer surface.

6. A tubular capacitor according to claim 1, wherein said second section, and the end surface lacking a metal layer, are at opposite ends of said core.

7. A tubular capacitor according to claim 1, wherein the diameter of said second section approximately equals that of said first section.

8. A tubular capacitor according to claim 1, further comprising a pair of metal caps, one positioned on one and of said sleevelike element, and another positioned on said second core section.

9. A tubular capacitor according to claim 8, wherein said caps are press fit in place.

10. A tubular capacitor according to claim 8, wherein the outside peripheral surface of said sleevelike element is covered with an electrically insulating varnish layer.

11. A tubular capacitor according to claim 10, further comprising a pair of leads, one connected to each of said caps, the metal caps and the leads beings coated with an electric insulating layer.

* * * * *